United States Patent
Jiang et al.

(10) Patent No.: US 8,200,386 B2
(45) Date of Patent: Jun. 12, 2012

(54) CONTROL DEVICE OF A FOUR-WHEEL DRIVE ELECTRIC VEHICLE AND METHOD THEREOF

(75) Inventors: Xianhong Jiang, Shenzhen (CN); Xuguang Zhou, Shenzhen (CN); Xiaohua Tang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 13/035,802

(22) Filed: Feb. 25, 2011

(65) Prior Publication Data
US 2011/0153132 A1    Jun. 23, 2011

Related U.S. Application Data

(63) Continuation of application No. PCT/CN2009/073623, filed on Aug. 28, 2009.

(30) Foreign Application Priority Data

Aug. 29, 2008  (CN) .......................... 2008 1 0210168

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl. ............... 701/22; 701/84; 701/89; 701/93; 701/99; 180/65.1; 180/65.31; 180/65.6; 180/65.7; 180/65.8; 318/139; 318/432; 318/433

(58) Field of Classification Search .................... 701/22, 701/99; 318/139, 432, 433, 587, 719, 800
See application file for complete search history.

(56) References Cited

U.S. PATENT DOCUMENTS

| | | | | |
|---|---|---|---|---|
| 5,289,890 A | * | 3/1994 | Toyoda et al. | 180/65.8 |
| 5,731,669 A | * | 3/1998 | Shimizu et al. | 318/139 |
| 6,424,110 B1 | * | 7/2002 | Daly | 318/471 |
| 7,298,104 B2 | * | 11/2007 | Besnard et al. | 318/432 |

OTHER PUBLICATIONS

Form PCT/ISA/237(Jul. 2009) 4pgs.

* cited by examiner

*Primary Examiner* — Thomas Tarcza
*Assistant Examiner* — Rami Khatib
(74) *Attorney, Agent, or Firm* — Squire Sanders (US) LLP

(57) ABSTRACT

A method of controlling an accelerator of a four-wheel drive electric vehicle comprises the steps of controlling power output of the vehicle by a sum of an output torque of a main drive motor and an output torque an auxiliary drive motor with the output torque of the main drive motor being determined by a position of the accelerator pedal. The output torque $T_0$ of the auxiliary drive motor is determined by: obtaining a torque calculation factor GainAccSum that a cumulative value of the acceleration GainAcc of the accelerator pedal; determining a maximum output torque T of the auxiliary drive motor at a current speed of the vehicle; and calculating the output torque $T_0$ of the auxiliary drive motor varying between 0 and T based on the torque calculation factor GainAccSum and the maximum output torque T of the auxiliary drive motor at the current speed of the vehicle.

14 Claims, 2 Drawing Sheets

CONTROL DEVICE OF A FOUR-WHEEL DRIVE ELECTRIC VEHICLE AND METHOD THEREOF

CROSS-REFERENCE TO RELATED APPLICATIONS

The present application claims the priority of Chinese Patent Application No. 2008-10210168.x filed on Aug. 29, 2008, which is incorporated by reference herein in its entirety. This application is a continuation of PCT International Patent Application No. PCT/CN2009/073623 filed Aug. 28, 2009 designating the United States, the entire disclosure of which is incorporated herein by reference.

FIELD OF THE INVENTION

The present invention relates to vehicle control, more particularly to a method of controlling a four-wheel drive electric vehicle and a control device of a four-wheel drive electric vehicle.

BACKGROUND OF THE INVENTION

The power control strategy is very important to the operation of a motor vehicle.

Generally, the output power of an electric vehicle is controlled by the torque. When the accelerator pedal is depressed, the motor controller of the electric vehicle calculates the output torque of the motor according to the position of the accelerator pedal to control the vehicle. The output torque of the motor has a linear relationship with the position of the accelerator pedal, namely $T_0=T*Gain$, wherein $T_0$ is the output torque of the motor, T is the maximum output torque of the motor at the current speed which can be obtained by the corresponding curve relationship of the maximum output torque of the motor and the motor speed, and Gain is the position of the accelerator pedal. So the output torque of the motor is determined by the position of the accelerator pedal. During vehicle acceleration, if a larger output torque is needed the position of the accelerator pedal should be increased.

The power performance of the vehicle is determined by the accelerator pedal precision. When utilizing the detected position of the accelerator pedal, the motor controller needs to eliminate the noise in the position of the accelerator pedal using wave filtering to ensure that the calculated position of the accelerator pedal correctly reflects the operation of the operator. But the method of controlling the power output using the position of the accelerator pedal is difficult to respond the operation of the operator quickly and correctly.

However, for a four-wheel drive pure-electric vehicle, there is a higher demand for the power performance of the vehicle. Thus the power control strategy should determine the driver's demand in a short time and execute the demand quickly. The power of the four-wheel electric vehicle is always controlled by the main drive motor and the auxiliary drive motor. Currently, the main drive motor and the auxiliary drive motor are controlled using the power output method of traditional vehicles, that is, the output torque is controlled by the position of the accelerator pedal. In this method for the auxiliary drive motor, it is difficult to respond the driver's demand quickly and reach the power output with high precision. Also this accelerator control strategy is a waste of vehicle energy.

SUMMARY OF THE INVENTION

In viewing thereof, the present invention is directed to solving at least one of the problems existing in the prior art.

Accordingly, a method for controlling an accelerator of a four-wheel drive electric vehicle is provided so that the vehicle can respond quickly to the demand of a driver. Further, the method may enhance the precision of power output. Still further, an accelerator control device of a four-wheel drive electric vehicle is provided.

According to an embodiment of the invention, a method of controlling an accelerator of a four-wheel drive electric vehicle is provided. The method comprises the following steps: controlling the power output of the vehicle based on a sum of an output torque of a main drive motor and an output of an auxiliary drive motor with the output torque of the main drive motor being determined by a position of an accelerator pedal. The output torque $T_0$ of the auxiliary drive motor is determined by: obtaining a torque calculation factor GainAccSum being a cumulative value of the acceleration GainAcc of the accelerator pedal; determining a maximum output torque T of the auxiliary drive motor at the current speed of the vehicle; and calculating the output torque $T_0$ of the auxiliary drive motor varying between 0 and T based on the torque calculation factor GainAccSum and the maximum output torque T of the auxiliary drive motor at the current speed of the vehicle with the output torque $T_0$ of the auxiliary drive motor being increased as the torque calculation factor GainAccSum increases.

According to another embodiment of the invention, an accelerator control device of a four-wheel drive electric vehicle is provided. The accelerator control device comprises a sensor for sensing a position of an accelerator pedal; a speed sensor for detecting a current speed of the electric vehicle; a motor controller connected with the sensor for sensing the position of the accelerator pedal and the speed sensor for controlling the output torque of the main motor based on the position detected and the current speed of the vehicle and for determining an output torque of the auxiliary drive motor and controlling the output torque thereof with a sum of the output torque of the main motor and the output torque of the auxiliary drive motor being used for controlling the power output of the vehicle. The control device determines the output torque $T_0$ of the auxiliary drive motor by: obtaining a torque calculation factor GainAccSum being a cumulative value of a acceleration GainAcc of the accelerator pedal; determining a maximum output torque T of the auxiliary drive motor at a current speed of the vehicle; and calculating the output torque $T_0$ of the auxiliary drive motor varying between 0 and T based on the torque calculation factor GainAccSum and the maximum output torque T of the auxiliary drive motor at the current speed of the vehicle with the output torque $T_0$ of the auxiliary drive motor being increased as the torque calculation factor GainAccSum increases.

Therefore, the present invention discloses an accelerator accelerating control method of a four-wheel drive electric vehicle and the device thereof. It applies the method of using the accelerations of the accelerator to calculate the torque calculation factor to determine the output torque of the auxiliary drive motor, which may omit complex steps of eliminating the noise of the determined position of the accelerator pedal; and has the advantages of quick response for the driver's purpose and high performance of the power output.

Because calculating the accelerator acceleration of each period and then accumulating to obtain the torque calculation factor, the accelerator accelerating control method of a four-wheel drive electric vehicle and the device thereof in present invention may provide the driver thereof with quicker response and omit the complex step of eliminating noises of the position of the accelerator pedal, which saves the response time. It also has the advantages of quick response for the driver's meaning and high performance of the power. After determining the output torque of the auxiliary drive motor, the torque calculation factor is attenuated to zero which may avoid energy waste during long-time operation of the auxiliary drive motor to save the energy of the vehicle.

Additional aspects and advantages of the embodiments of present invention will be given in part in the following descriptions, become apparent in part from the following descriptions, or be learned from the practice of the embodiments present invention.

DESCRIPTION OF THE DRAWINGS

These and other aspects and advantages of the invention will become apparent and more readily appreciated from the following descriptions taken in conjunction with the drawings in which.

DETAILED DESCRIPTION OF THE PREFERRED EMBODIMENT

Figure 1:
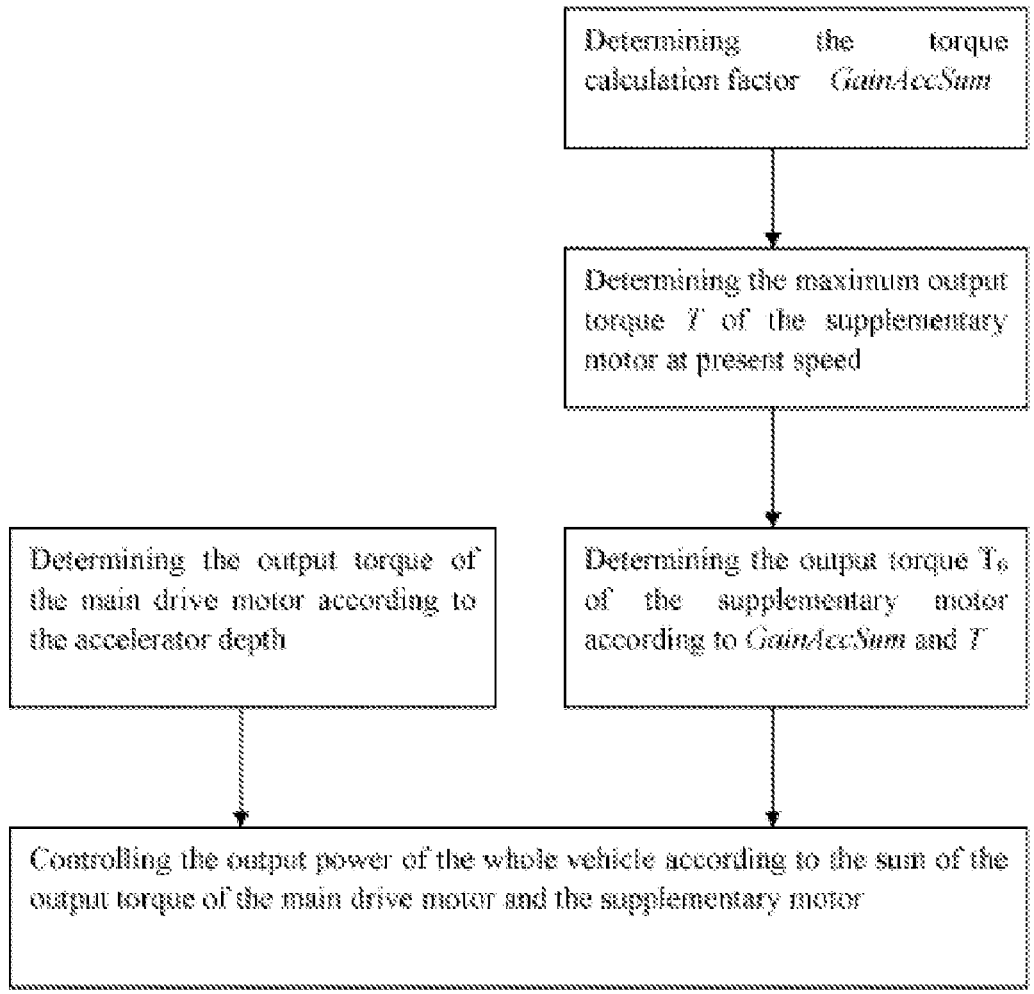
FIG. 1 is a flow chart of a method of controlling an accelerator of a four-wheel drive electric vehicle according to an embodiment of the invention.

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

Figure 2:
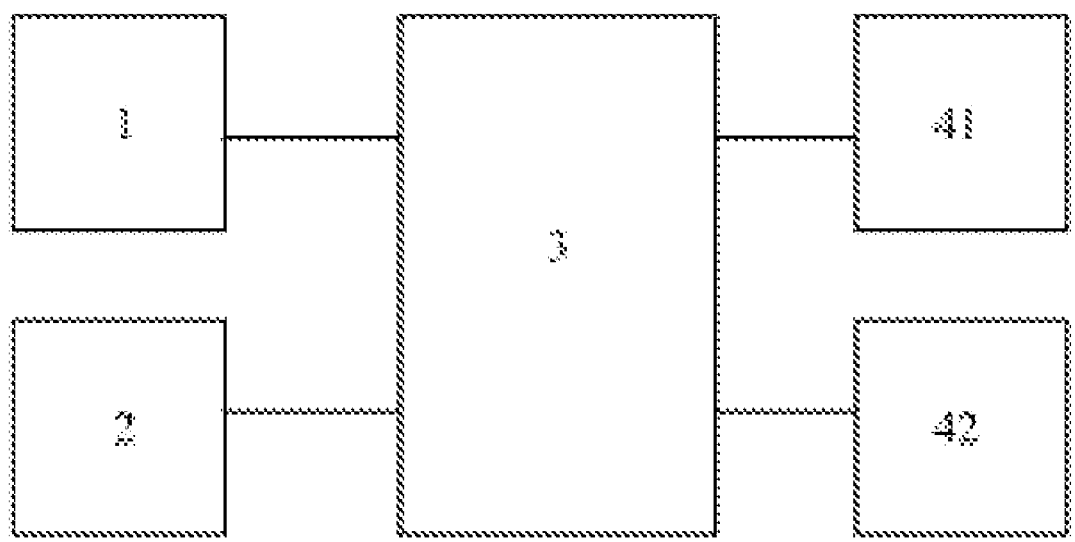
FIG. 2 is a block diagram of an accelerator control device of a four-wheel drive electric vehicle according to an embodiment of the invention.

As shown in FIGS. 1 and 2, the present invention discloses a control method of a four-wheel drive electric vehicle. The method comprises the following steps:

controlling the power output of the vehicle based on a sum of an output torque of a main drive motor 41 and an output torque of an auxiliary drive motor 42 with the output torque of the main drive motor being determined by a position of an accelerator pedal. The output torque $T_0$ of the auxiliary drive motor is determined by:

obtaining a torque calculation factor GainAccSum, which is the cumulative value of the accelerator's acceleration GainAcc; determining a maximum output torque T of the auxiliary drive motor 42 at the current speed of the vehicle; and calculating the output torque $T_0$ of the auxiliary drive motor 42 varying between 0 and T based on the torque calculation factor GainAccSum and the maximum output torque T of the auxiliary drive motor 42 at the current speed of the vehicle with the output torque $T_0$ of the auxiliary drive motor being increased as the torque calculation factor GainAccSum increases.

As known in the art, the four-wheel drive electric vehicle runs in a full-time mode in the whole operating process. In the full-time mode, the main drive motor 41 detects the status of the whole vehicle in real time to determine if the vehicle runs in a condition of starting, accelerating or climbing. And when the vehicle is in the full-time mode, the output torque of the auxiliary drive motor 42 is zero except when the vehicle is accelerating. Namely, in the full-time mode, the output power of the vehicle is provided substantially by the main drive motor 41.

In a method according to an embodiment of the invention, the step of determining the torque calculation factor GainAccSum comprises the following steps: obtaining a start position $Gain_1$ of the accelerator pedal and an end position $Gain_0$ of the accelerator pedal in a period of time $\Delta T$; calculating the accelerator acceleration GainAcc according to the formula of:

$$GainAcc = Gain_0 - Gain_1/\Delta T;$$

and obtaining the torque calculation factor GainAccSum by accumulating the values of the accelerator GainAcc calculated in a plurality of consecutive time periods.

The period $\Delta T$ may be about 100 μs to 1000 μs. Normally, a per-unit value of an electric power system is used for calculation and the master control period, usually being about 100 μs, is chosen as a reference. In the above formula, the per-unit value of the period $\Delta T$ is used accordingly, namely the ratio of the actual period and the master control period is used for calculation varying from 1 to 10. The values of the accelerator GainAcc is accumulated by substantially 5000 to 10000 periods. The period $\Delta T$ may be chosen as the master control period of the motor controller 3, thus the per-unit value of the period $\Delta T$ for the calculation is 1. The values of the accelerator GainAcc calculated in 10000 periods should be accumulated. Because the master control period of the motor is relatively short, such as the 100 μs as mentioned above, the true intent of an operator of the vehicle may be better reflected by choosing a suitable time period to accumulate the acceleration values GainAcc of the accelerator in the time periods.

According to an embodiment of the invention, when the torque calculation factor GainAccSum is equal to or exceeds a limit of the torque calculation factor, the accumulation of the acceleration values GainAcc of the accelerator in the time periods has to be suspended. And the limit of the torque calculation factor is used as the torque calculation factor GainAccSum. The limit of the torque calculation factor is about 0.9 to 1. In one embodiment, the torque calculation factor is 0.9. The torque calculation factor GainAccSum should be limited so that the torque calculation factor GainAccSum may be gradually attenuated to zero in a certain time to avoid and/or reduce energy consumption for the long time operation of the auxiliary drive motor 42.

The step of determining the maximum output torque T of the auxiliary drive motor 42 at the current speed of the vehicle may comprise the following steps: obtaining the current speed of the vehicle; and determining the maximum output torque T of the auxiliary drive motor 42 at the current speed of the vehicle according to the corresponding curve relationship of the maximum output torque and the speed. The maximum output torque T of the auxiliary drive motor 42 is a function of speed. There is a corresponding curve relationship between the maximum output torque of the auxiliary drive motor 42 and the current speed of the vehicle. The curve relationship may be determined beforehand by experiment.

According to the torque calculation factor GainAccSum and the maximum output torque T of the auxiliary drive motor 42 at the current speed of the vehicle, the output torque $T_0$ of the auxiliary drive motor 42 is calculated by multiplying the torque calculation factor GainAccSum with the maximum output torque T of the auxiliary drive motor 42 at the current speed of the vehicle:

$$T_0 = T * GainAccSum$$

In this way, when the accelerator pedal changes, the auxiliary drive motor 42 may be involved in the power output quickly. According to the linear property of the above formula, a positive torque calculation factor GainAccSum makes the auxiliary drive motor 42 deliver a torque, while a negative torque calculation factor GainAccSum makes the auxiliary drive motor 42 reduce the output torque. The auxiliary drive motor 42 may respond quickly to the demand of the driver. And the performance of the vehicle is improved accordingly. The output torque of the vehicle is the sum of the output torque of the main drive motor 41 and the output torque $T_0$ of the auxiliary drive motor 42.

According to an embodiment of the invention, after the auxiliary drive motor 42 outputs the calculated torque $T_0$, the torque calculation factor GainAccSum is attenuated to zero. According to an embodiment of the present invention, the torque calculation factor GainAccSum is limited to no more than the limit on the torque calculation factor. In this way, the torque calculation factor GainAccSum may gradually decrease to zero by itself in a certain time limit to reduce energy output in normal operation. Because the auxiliary drive motor 42 has no cooling loop, there should be certain limit on the operation of the auxiliary drive motor 42, such as attenuating gradually the torque calculation factor to zero to further decrease the output torque of the auxiliary drive motor 42 to zero gradually as mentioned above. This can reduce the energy consumption of the vehicle and extend the service time of the auxiliary drive motor 42. If in a damping process of the vehicle, when the driver releases the accelerator pedal, the attenuation of the torque calculation factor is accelerated to push the auxiliary output torque to zero as soon as possible.

As shown in FIG. 2, the invention further discloses an accelerator control device of a four-wheel drive electric vehicle comprising a sensor 1, a speed sensor 2, and a motor controller 3. The sensor 1 is used to sense a position of an accelerator pedal. The speed sensor 2 is used to detect the current speed of the electric vehicle. The motor controller 3 is connected with the sensor 1 for sensing the position of the accelerator pedal and with the speed sensor 2 for controlling the output torque of the main motor 41 based on the accelerator pedal position detected and the current vehicle speed and for determining an output torque of the auxiliary drive motor 42 and controlling the output torque thereof with a sum of the output torque of the main motor 41 and the output torque of the auxiliary drive motor 42 being used for controlling the power output of the vehicle.

The control device determines the output torque $T_0$ of the auxiliary drive motor 42 by: obtaining a torque calculation factor GainAccSum that is a cumulative value of an acceleration GainAcc of the accelerator pedal; determining a maximum output torque T of the auxiliary drive motor 42 at the current speed of the vehicle; and calculating the output torque $T_0$ of the auxiliary drive motor 42 varying between 0 and T based on the torque calculation factor GainAccSum and the maximum output torque T of the auxiliary drive motor 42 at the current speed of the vehicle with the output torque $T_0$ of the auxiliary drive motor 42 being increased as the torque calculation factor GainAccSum increases.

The torque calculation factor GainAccSum is determined by the motor controller 3 by: obtaining a start position $Gain_1$ of the accelerator pedal and an end position $Gain_0$ of the accelerator pedal in a period of $\Delta T$; calculating the accelerator acceleration GainAcc based on a formula of:

$$GainAcc = Gain_0 - Gain_1 / \Delta T; \text{ and}$$

obtaining the torque calculation factor GainAccSum by accumulating the values of the accelerator GainAcc calculated in a plurality of consecutive time periods.

In one embodiment, the period $\Delta T$ is about 100 μs to 1000 μs, and there are substantially 5000 to 10000 periods to accumulate the values of the accelerator GainAcc.

In other embodiment, the accumulation of the calculated acceleration values of the accelerator is suspended in the time periods and a limit on the torque calculation factor is used as the torque calculation factor GainAccSum ranging from 0.9 to 1 when the torque calculation factor GainAccSum is equal to or exceeds the limit of the torque calculation factor.

In the accelerator control device according to an embodiment of the present invention, the motor controller 3 can determine the torque calculation factor GainAccSum and the maximum output torque T of the auxiliary drive motor 42 at the current speed of the vehicle, and calculate the output torque $T_0$ of the auxiliary drive motor 42 according to the torque calculation factor GainAccSum and the maximum output torque T of the auxiliary drive motor 42 using the same methods as stated in the corresponding method steps of the present invention. The motor controller 3 may comprise a programmable microprocessor and an external circuit thereof. Generally, the main drive motor 41 and the auxiliary drive motor 42 may be controlled by an integrated-box motor controller 3. The integrated-box motor controller 3 may comprise a motor control board, a drive board and an IPM intelligent module, etc.

As known in the art, whether it is a mechanical or fuel pressure accelerator system, there usually is a sensor 1 to sense a position of the accelerator pedal and the signal of the position is transferred to the motor controller 3.

In light of the accelerator control device of the four-wheel drive electric vehicle according to the present invention, the position of the accelerator pedal is detected by the sensor 1 for sensing the position of the accelerator pedal and is transmitted to the motor controller 3. The position of the accelerator pedal is monitored by the motor controller 3. According to an embodiment of the invention, the monitoring precision is about 1%, the period $\Delta T$ may be the master control period of the motor controller 3, which is 100 μs. The motor controller 3 firstly obtains the master control period, i.e., obtains the start position $Gain_1$ of the accelerator pedal and the end position $Gain_0$ of the accelerator pedal in the time period of 100 μs, and the accelerator pedal acceleration GainAcc is calculated by the following formula: $GainAcc = Gain_0 - Gain_1/\Delta T$. In consecutive 10000 master control periods, namely in 1 second, 10000 acceleration values of the accelerator pedal GainAcc are calculated which are accumulated to obtain the torque calculation factor GainAccSum for calculating the output torque $T_0$ of the auxiliary drive motor. And the torque calculation factor GainAccSum is restricted to be no more than the limit on the torque calculation factor. The current speed of the electric vehicle is detected by the speed sensor 2. According to the detected current speed of the electric vehicle and the corresponding curve relationship of the maximum output torque of the auxiliary drive motor for the current speed of the vehicle, the motor controller 3 obtains the maximum output torque T of the auxiliary drive motor 42 at the current speed of the vehicle. Now, using the formula $T_0 = T*GainAccSum$, the motor controller 3 calculates the output torque $T_0$ of the auxiliary drive motor 42 and the auxiliary drive motor 42 is controlled to output the calculated output torque $T_0$. The motor controller 3 determines the output torque of the main drive motor 41 based on the position of the accelerator pedal using any known method. The output power of the vehicle is controlled by the sum of the output torque of the main drive motor 41 and the output torque of the auxiliary drive motor 42. In addition, after the auxiliary drive motor 42 is controlled to output the calculated output torque $T_0$, the torque calculation factor GainAccSum is attenuated to zero to attenuate the output torque of the auxiliary drive motor 42. When the torque calculation factor is attenuated to zero, the auxiliary drive motor 42 does not output any torque and enters into a full-time waiting mode. At this time, only the output torque of the main drive motor 41 is used as the power source of the vehicle. With the accelerator control method and the device thereof of present invention, the vehicle can provide a quick response to the demand of the driver and consume less energy.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. A method of controlling a four-wheel drive electric vehicle, comprising the following steps:

controlling a power output of the vehicle based on a sum of an output torque of a main drive motor and an output torque of an auxiliary drive motor with the output torque of the main drive motor being determined based on a position of an accelerator pedal, wherein the output torque $T_0$ of the auxiliary drive motor is determined by:

obtaining a torque calculation factor GainAccSum that is a cumulative value of an acceleration GainAcc of the accelerator pedal, wherein the torque calculation factor GainAccSum is an accumulation of values of the acceleration GainAcc from a plurality of consecutive time periods;

determining a maximum output torque T of the auxiliary drive motor at a current speed of the vehicle; and calculating the output torque $T_0$ of the auxiliary drive motor varying between 0 and T based on the torque calculation factor GainAccSum and the maximum output torque T of the auxiliary drive motor at the current speed of the vehicle with the output torque $T_0$ of the auxiliary drive motor being increased as the torque calculation factor GainAccSum increases.

2. The method according to claim 1, wherein the step of determining the torque calculation factor GainAccSum comprising the following steps:

obtaining a start position $Gain_1$ of the accelerator pedal and an end position $Gain_0$ of the accelerator pedal in a period of $\Delta T$;

calculating the accelerator acceleration GainAcc based on a formula of:

$$GainAcc = Gain_0 - Gain_1/\Delta T;\text{ and}$$

obtaining the torque calculation factor GainAccSum by accumulating the values of the accelerator GainAcc calculated in a plurality of consecutive time periods.

3. The method according to claim 2, wherein the period $\Delta T$ is about 100 µs to 1000 µs, and there are substantially 5000 to 10000 periods to accumulate the values of the accelerator GainAcc.

4. The method according to claim 2, wherein the accumulation of the calculated values of the accelerator is suspended in the plurality of time periods and a limit on the torque calculation factor is used as the torque calculation factor GainAccSum ranging from 0.9 to 1 when the torque calculation factor GainAccSum is equal to or exceeds the limit on the torque calculation factor.

5. The method according to claim 1, wherein the step of determining the maximum output torque T of the auxiliary drive motor at the current vehicle speed comprises the following steps:

obtaining the current vehicle speed; and determining the maximum output torque T of the auxiliary drive motor at the current vehicle speed according to a corresponding curve relationship of the maximum output torque and the vehicle speed.

6. The method according to claim 1, wherein the output torque $T_0$ of the auxiliary drive motor is calculated by multiplying the torque calculation factor GainAccSum with the maximum output torque T of the auxiliary drive motor at the current speed of the vehicle:

$$T_0 = T * GainAccSum.$$

7. The method according to claim 1, further comprising a step of attenuating the torque calculation factor GainAccSum to zero after controlling the auxiliary drive motor to output the output torque $T_0$.

8. An accelerator control device of a four-wheel drive electric vehicle, comprising:

a sensor for sensing a position of an accelerator pedal;

a speed sensor for detecting a current speed of the electric vehicle;

a motor controller connected with the sensor for sensing the position of the accelerator pedal and the speed sensor for controlling the output torque of a main electric motor of the electric vehicle based on the pedal position detected and the current speed of the vehicle and for determining an output torque of an auxiliary drive motor of the electric vehicle and controlling the output torque of the auxiliary drive motor with a sum of the output torque of the main motor and the output torque of the auxiliary drive motor, wherein the control device determines the output torque $T_0$ of the auxiliary drive motor by:

obtaining a torque calculation factor GainAccSum that is a cumulative value of a acceleration GainAcc of the accelerator pedal, wherein the torque calculation factor GainAccSum is an accumulation of values of the acceleration GainAcc from a plurality of consecutive time periods;

determining a maximum output torque T of the auxiliary drive motor at a current speed of the vehicle; and calculating the output torque $T_0$ of the auxiliary drive motor varying between 0 and T based on the torque calculation factor GainAccSum and the maximum output torque T of the auxiliary drive motor at the current speed of the vehicle with the output torque $T_0$ of the auxiliary drive motor being increased as the torque calculation factor GainAccSum increases.

9. The accelerator control device according to claim 8, wherein the torque calculation factor GainAccSum is determined by the motor controller by:

obtaining a start position $Gain_1$ of the accelerator pedal and an end position $Gain_0$ of the accelerator pedal in a period of $\Delta T$;

calculating the acceleration GainAcc of the accelerator pedal based on a formula of:

$$GainAcc = Gain_0 - Gain_1/\Delta T;\text{ and}$$

obtaining the torque calculation factor GainAccSum by accumulating the values of the GainAcc calculated in a plurality of consecutive time periods.

10. The accelerator control device according to claim 9, wherein the period $\Delta T$ is about 100 µs to 1000 µs, and there are about 5000 to 10000 periods to accumulate the acceleration values of the accelerator GainAcc.

11. The accelerator control device according to claim 9, wherein the accumulation of the calculated acceleration of the accelerator pedal is suspended in the plurality of time periods and a limit on the torque calculation factor is used as the torque calculation factor GainAccSum ranging from 0.9 to 1 when the torque calculation factor GainAccSum is equal to or exceeds the limit on the torque calculation factor.

12. The accelerator control device according to claim 8, wherein the motor controller determines the maximum output torque T of the auxiliary drive motor by:
- obtaining the current speed of the vehicle; and
- determining the maximum output torque T of the auxiliary drive motor at the current speed of the vehicle according to the corresponding curve relationship of the maximum output torque and vehicle speed.

13. The accelerator control device according to claim 8, wherein the output torque $T_0$ of the auxiliary drive motor is calculated by multiplying the torque calculation factor GainAccSum with the maximum output torque T of the auxiliary drive motor at the current speed of the vehicle:

$$T_0 = T*\text{GainAccSum}.$$

14. The accelerator control device according to claim 8, wherein the cumulative torque calculation factor GainAccSum is attenuated to zero by the motor controller after the auxiliary drive motor is controlled to output the calculated output torque $T_0$.

* * * * *